(12) United States Patent
Loftis et al.

(10) Patent No.: US 9,817,113 B2
(45) Date of Patent: Nov. 14, 2017

(54) SYSTEMS AND METHODS FOR VERIFYING A LOCATION OF AN ITEM

(71) Applicant: THE BOEING COMPANY, Huntington Beach, CA (US)

(72) Inventors: Richard John Loftis, Arlington, WA (US); Andrew Lewis Armatorio, Everett, WA (US)

(73) Assignee: The Boeing Company, Chicago, IL (US)

( * ) Notice: Subject to any disclaimer, the term of this patent is extended or adjusted under 35 U.S.C. 154(b) by 12 days.

(21) Appl. No.: 14/520,444

(22) Filed: Oct. 22, 2014

(65) Prior Publication Data
US 2016/0116579 A1    Apr. 28, 2016

(51) Int. Cl.
| | | |
|---|---|---|
| G01S 13/88 | (2006.01) | |
| G06Q 10/08 | (2012.01) | |
| G06Q 50/28 | (2012.01) | |
| G01S 13/75 | (2006.01) | |
| G06K 7/10 | (2006.01) | |

(52) U.S. Cl.
CPC ............ *G01S 13/88* (2013.01); *G01S 13/758* (2013.01); *G06K 7/10297* (2013.01); *G06Q 10/0833* (2013.01); *G06Q 50/28* (2013.01)

(58) Field of Classification Search
CPC ... G01S 13/88; G01S 13/758; G06K 7/10297; G06Q 10/0833; G06Q 50/28
USPC ................. 340/10.3, 10.1–10.6, 572.1–572.9
See application file for complete search history.

(56) References Cited

U.S. PATENT DOCUMENTS

| | | | |
|---|---|---|---|
| 3,352,040 A | 11/1967 | Javkin | |
| 7,030,760 B1 * | 4/2006 | Brown | ................... B64F 1/368 |
| | | | 235/384 |
| 7,606,530 B1 * | 10/2009 | Anderson | .......... G06K 7/10178 |
| | | | 455/41.2 |
| 7,777,629 B2 | 8/2010 | Lee et al. | |
| 7,845,569 B1 | 12/2010 | Warther et al. | |
| 7,916,025 B2 | 3/2011 | Locker et al. | |
| 8,258,954 B2 | 9/2012 | Knadle, Jr. et al. | |
| 8,616,457 B2 | 12/2013 | Krawczewicz et al. | |
| 2003/0063346 A1 * | 4/2003 | Pez | ........................ H04J 14/005 |
| | | | 398/58 |
| 2003/0200546 A1 * | 10/2003 | Keen | ..................... G06Q 30/02 |
| | | | 725/76 |
| 2004/0169587 A1 * | 9/2004 | Washington | ....... G06K 7/10079 |
| | | | 340/573.1 |

(Continued)

FOREIGN PATENT DOCUMENTS

WO        2014161556 A1    10/2014

OTHER PUBLICATIONS

EP Extended Search Report for related application 15190385.3 dated Feb. 22, 2016; 7 pp.

*Primary Examiner* — George Bugg
*Assistant Examiner* — Thang Tran
(74) *Attorney, Agent, or Firm* — Armstrong Teasdale LLP

(57) ABSTRACT

A method for use in verifying a location of an item aboard a vehicle is provided. The method includes receiving, by a transceiver device located in the vehicle, at least one radio frequency identification (RFID) signal. Each RFID signal is associated with an RFID tag of an item aboard the vehicle. The method additionally includes processing the at least one RFID signal and transmitting, by the transceiver device, the at least one RFID signal to a passenger compartment of the vehicle.

15 Claims, 5 Drawing Sheets

(56) References Cited

U.S. PATENT DOCUMENTS

| | | | |
|---|---|---|---|
| 2006/0220857 A1* | 10/2006 | August | G06K 17/00 340/572.1 |
| 2011/0133891 A1* | 6/2011 | Krug | G06K 7/0008 340/10.1 |
| 2012/0026016 A1* | 2/2012 | Mitchell | G06Q 10/06 340/945 |
| 2012/0098642 A1* | 4/2012 | Krawczewicz | G06K 19/07707 340/10.1 |
| 2013/0050019 A1* | 2/2013 | Mahmoud | G06Q 10/08 342/357.25 |
| 2013/0234849 A1* | 9/2013 | Gupta | A45C 13/18 340/539.11 |
| 2014/0077952 A1 | 3/2014 | Boss et al. | |
| 2014/0173951 A1 | 6/2014 | Shimizu et al. | |
| 2014/0184387 A1 | 7/2014 | Svec | |
| 2014/0191851 A1 | 7/2014 | Warther | |
| 2014/0206347 A1 | 7/2014 | Shah et al. | |

\* cited by examiner

SYSTEMS AND METHODS FOR VERIFYING A LOCATION OF AN ITEM

BACKGROUND

The present disclosure relates generally to transporting luggage aboard a vehicle, and more specifically to informing a passenger that the passenger's luggage has been successfully loaded for transport.

In known systems for transporting a passenger's luggage, for example in a cargo compartment of a vehicle such as an aircraft, the passenger is unaware of whether the luggage has actually been loaded before the aircraft departs for a destination. Rather, the passenger trusts that operators of the airline have successfully identified the passenger's luggage and loaded it in the cargo compartment of the aircraft. At least some passengers may experience anxiety from being uncertain of whether their luggage was actually loaded into the aircraft. Accordingly, it would be beneficial if passengers could obtain verification that their luggage has been successfully loaded aboard the aircraft.

BRIEF DESCRIPTION

In one aspect, a method for use in verifying a location of an item aboard a vehicle is provided. The method includes receiving, by a transceiver device located in the vehicle, at least one radio frequency identification (RFID) signal. Each RFID signal is associated with an RFID tag of an item aboard the vehicle. The method additionally includes processing the at least one RFID signal and transmitting, by the transceiver device, the at least one RFID signal to a passenger compartment of the vehicle.

In another aspect, a system for use in verifying a location of an item aboard a vehicle is provided. The system includes a transceiver device configured to receive at least one radio frequency identification (RFID) signal. Each RFID signal is associated with an RFID tag of an item aboard the vehicle. The transceiver device is additionally configured to process the at least one RFID signal and transmit the at least one RFID signal to a passenger compartment of the vehicle.

In another aspect, a computer-readable storage medium having computer-executable instructions embodied thereon for use in verifying a location of an item aboard a vehicle is provided. When executed by a transceiver device, the computer-executable instructions cause the transceiver device to receive at least one radio frequency identification (RFID) signal. Each RFID signal is associated with an RFID tag of an item aboard the vehicle. The computer-executable instructions additionally cause the transceiver device to process the at least one RFID signal and transmit the at least one RFID signal to a passenger compartment of the vehicle.

DETAILED DESCRIPTION

In one implementation, a computer program is provided, and the program is embodied on a computer-readable medium. In an example implementation, the computer program is executed on a single computing device, without requiring a connection to a server computer. The computer program is flexible and designed to run in various different environments without compromising any major functionality. In some implementations, the system includes multiple components distributed among a plurality of computing devices. One or more components may be in the form of computer-executable instructions embodied in a computer-readable medium. The systems and processes are not limited to the specific implementations described herein. In addition, components of each system and each process can be practiced independent and separate from other components and processes described herein. Each component and process can also be used in combination with other assembly packages and processes.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Figure 1:
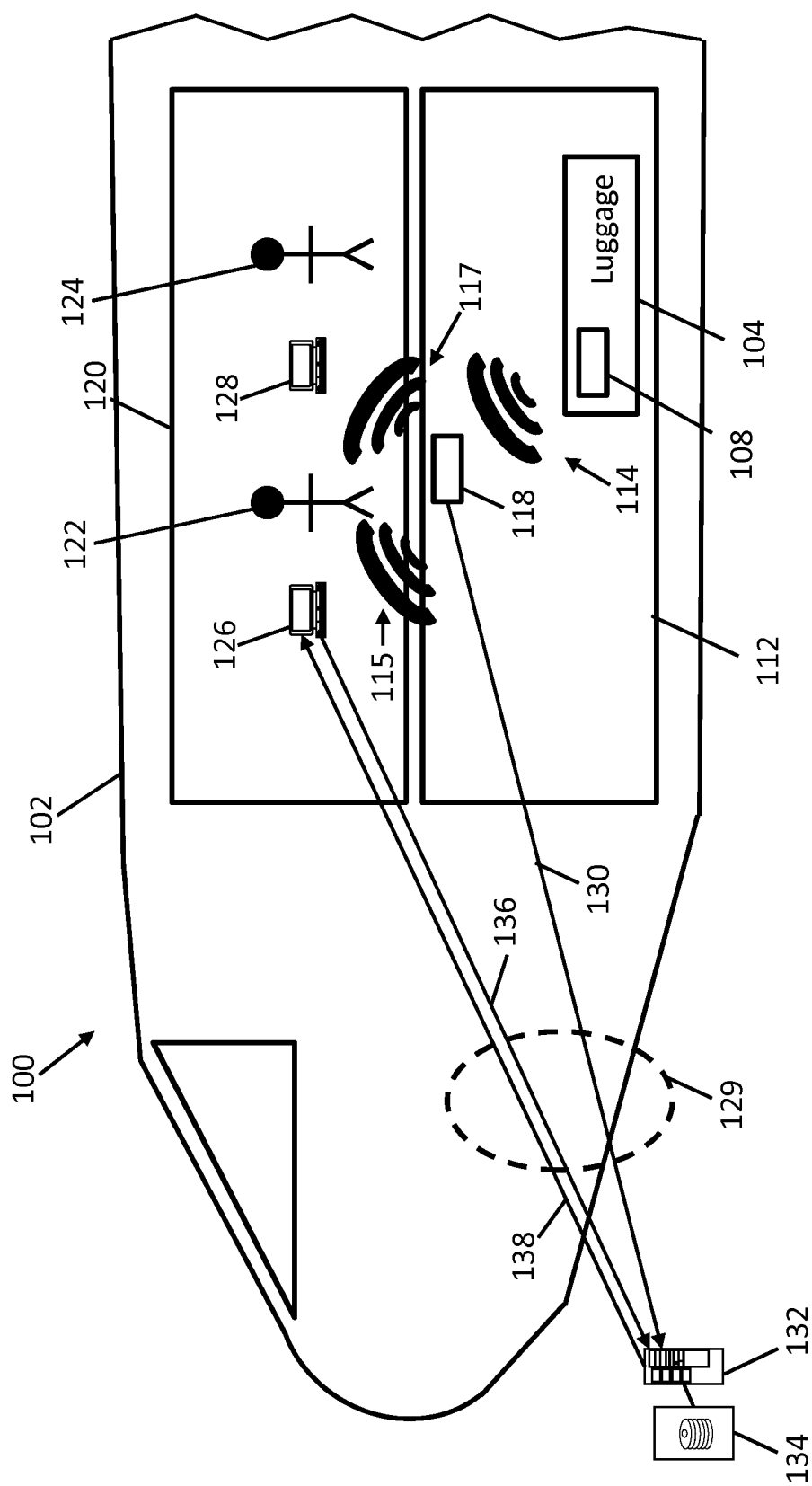
FIG. 1 is a diagram of an example environment in which a location of a luggage item is verified.

FIG. 1 is a diagram of an environment 100 that includes a vehicle 102. Vehicle 102 is, for example, an aircraft. Vehicle 102 includes a luggage item 104. A tag 108 is located with (i.e., affixed to or stored inside) luggage item 104. Tag 108 is, for example, a radio frequency identification (RFID) tag. As used herein, the terms "RFID" and "RFID signal" refer to the transmission of an identification of an object using electromagnetic radiation. In some implementations, tag 108 is an active RFID tag. In other implementations, tag 108 is a passive RFID tag. Further, in at least some implementations, tag 108 is programmed with information a single time, for example when tag 108 is created. In other implementations, tag 108 is reprogrammable. Information stored in association with tag 108 is described in more detail herein.

Luggage item 104 is located in a cargo compartment 112 of vehicle 102. While a single luggage item (e.g., luggage item 104) is shown and described with reference to FIG. 1, in other implementations, cargo compartment 112 holds additional luggage items, at least some of which also have tags similar to tag 108. Tag 108 transmits an RFID signal 114 that is received by a transceiver device 118. In turn, transceiver device 118 transmits RFID signal 114 to passenger compartment 120. More specifically, transceiver device 118 re-transmits RFID signal 114 as signals 115 and 117 from cargo compartment 112 to passenger compartment 120 because, in at least some implementations, for example in implementations in which luggage tag 108 is a passive RFID tag, RFID signal 114 would have insufficient range to reach passenger compartment without being re-transmitted. In at least some implementations, signals 115 and 117 are the same signal.

Passenger compartment 120 includes a first passenger 122 and a second passenger 124. First passenger 122 operates a first client computing device 126 and second passenger 124 operates a second client computing device 128. In some implementations, one or more of first passenger 122 and second passenger 124 are crew members or other people aboard vehicle 102. First client computing device 126 and second client computing device 128 are, for example, smart phones, tablets, notebook computing devices, or watches. In some implementations, first client computing device 126 and second client computing device 128 are terminals of a passenger entertainment system (e.g., an in-flight entertainment system) installed in vehicle 102.

In some implementations, first client computing device 126 and second client computing device 128 are configured to receive RFID signals 115 and/or 117 and determine from RFID signals 115 and/or 117 that luggage item 104 is aboard vehicle 102. In some implementations, each of first client computing device 126 and second client computing device 128 stores at least one unique identifier associated with a tag of a luggage item (e.g., tag 108 of luggage item 104) and detects the unique identifier in RFID signals 115 and/or 117. Accordingly, if luggage item 104 is associated with first passenger 122, first client computing device 126 is configured to detect a unique identifier associated with tag 108 in RFID signals 115 and/or 117, while second client computing device 128 is configured to detect a different unique identifier in a second RFID signal (not shown) transmitted by a second tag (not shown) from a second luggage item (not shown).

In some implementations, one or more of first client computing device 126 and second client computing device 128 is not configured to receive RFID signals 115 and/or 117. For example, in some implementations, first client computing device 126 does not include an RFID receiver but is configured to transmit and receive data through a network 129 such as a wireless network and/or a wired network. In some implementations, transceiver device 118 receives RFID signal 114, extracts data from RFID signal 114, and generates a reformatted signal 130 that has a different format than RFID signal 114. For example, reformatted signal 130 is formatted for transmission through network 129. In some implementations, reformatted signal 130 is transmitted wirelessly. In other implementations, reformatted signal 130 is transmitted through a wired connection. In some implementations, a luggage tracking server computing device 132 is coupled to transceiver device 118 and at least one of first client computing device 126 and second client computing device 128 through network 129. In some implementations, luggage tracking server computing device 132 is located external to vehicle 102. In other implementations, luggage tracking server computing device 132 is aboard vehicle 102.

In some implementations, transceiver device 118 transmits reformatted signal 130 to luggage tracking server computing device 132 through network 129 and luggage tracking server computing device 132 updates a database 134 with information pertaining to luggage item 104 based on reformatted signal 130. First client computing device 126 transmits a request signal 136 to luggage tracking server computing device 132. In some implementations, request signal 136 includes the unique identifier of tag 108 and/or other information associated with tag 108 and/or luggage item 104. In response, luggage tracking server computing device 132 transmits a luggage information signal 138 to first client computing device 126 including information pertaining to the location of luggage item 104 (e.g., verification that luggage item 104 is aboard vehicle 102). In some implementations, luggage tracking server computing device 132 transmits luggage information signal 138 to first client computing device 126 without first receiving request signal 136. In some implementations, luggage tracking server computing device 132 includes a web server and luggage information signal 138 includes formatting information for rendering a web page on first client computing device 126.

Figure 2:
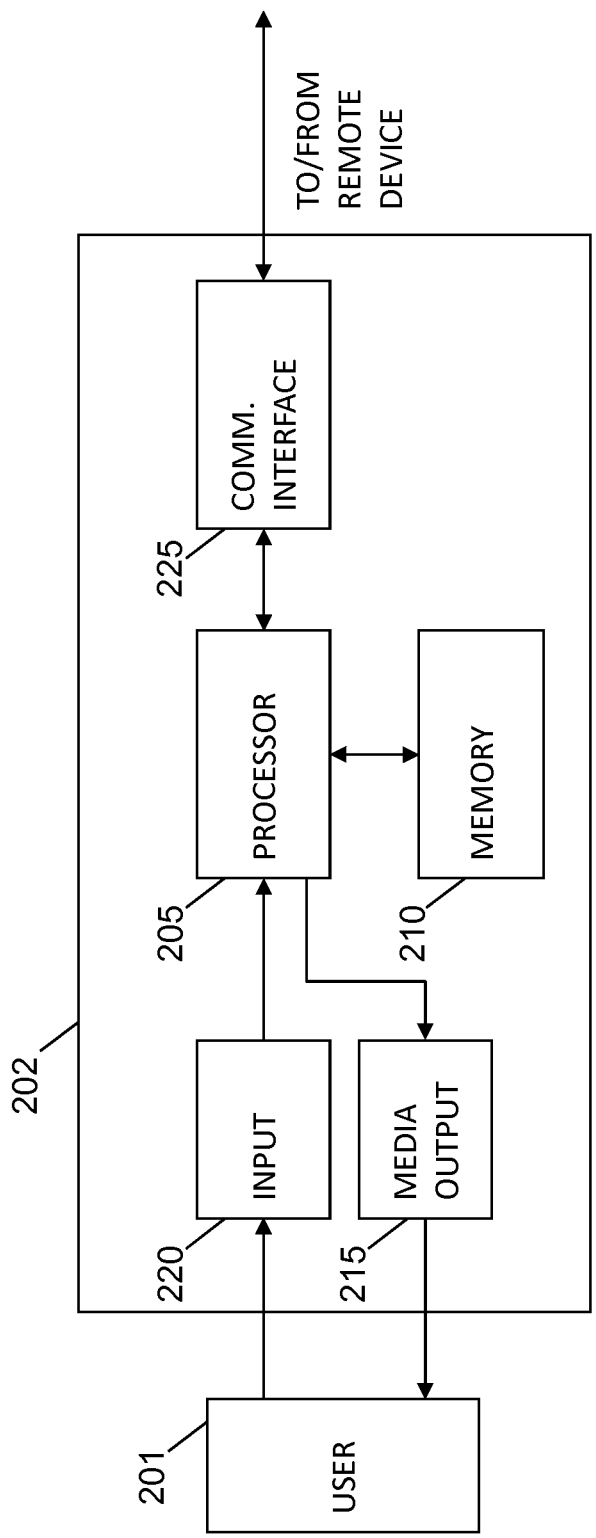
FIG. 2 is a block diagram of an example computing device used in the environment of FIG. 1.

FIG. 2 is a block diagram of an example computing device 202. Computing device 202 is representative of transceiver device 118, first client computing device 126, second client computing device 128, and luggage tracking server computing device 132. More specifically, each of transceiver device 118, first client computing device 126, second client computing device 128, and luggage tracking server computing device 132 includes one or more components of computing device 202. Computing device 202 includes at least one processor 205 for executing instructions. In some implementations, executable instructions are stored in a memory device 210. Processor 205 may include one or more processing units (e.g., in a multi-core configuration). One or more memory devices 210 are any one or more devices allowing information such as executable instructions and/or other data to be stored and retrieved. One or more memory devices 210 may include one or more computer-readable media.

Computing device 202 also includes at least one media output component 215 for presenting information to a user 201. Media output component 215 is any component capable of conveying information to user 201. In some implementations, media output component 215 includes an output adapter such as a video adapter and/or an audio adapter. An output adapter is operatively coupled to processor 205 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some implementations, computing device 202 includes an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

Computing device 202 additionally includes a communication interface 225, which is communicatively couplable to a remote device such as another computing device 202. Communication interface 225 may include, for example, an RFID signal receiver, an RFID signal transmitter, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in one or more memory devices 210 are, for example, computer-readable instructions for providing a user interface to user 201 via media output component 215 and, optionally, receiving and processing input from input device 220. A user interface may include, text, graphics, and/or sound that enable user 201 to interact with computing device 202.

Figure 3:
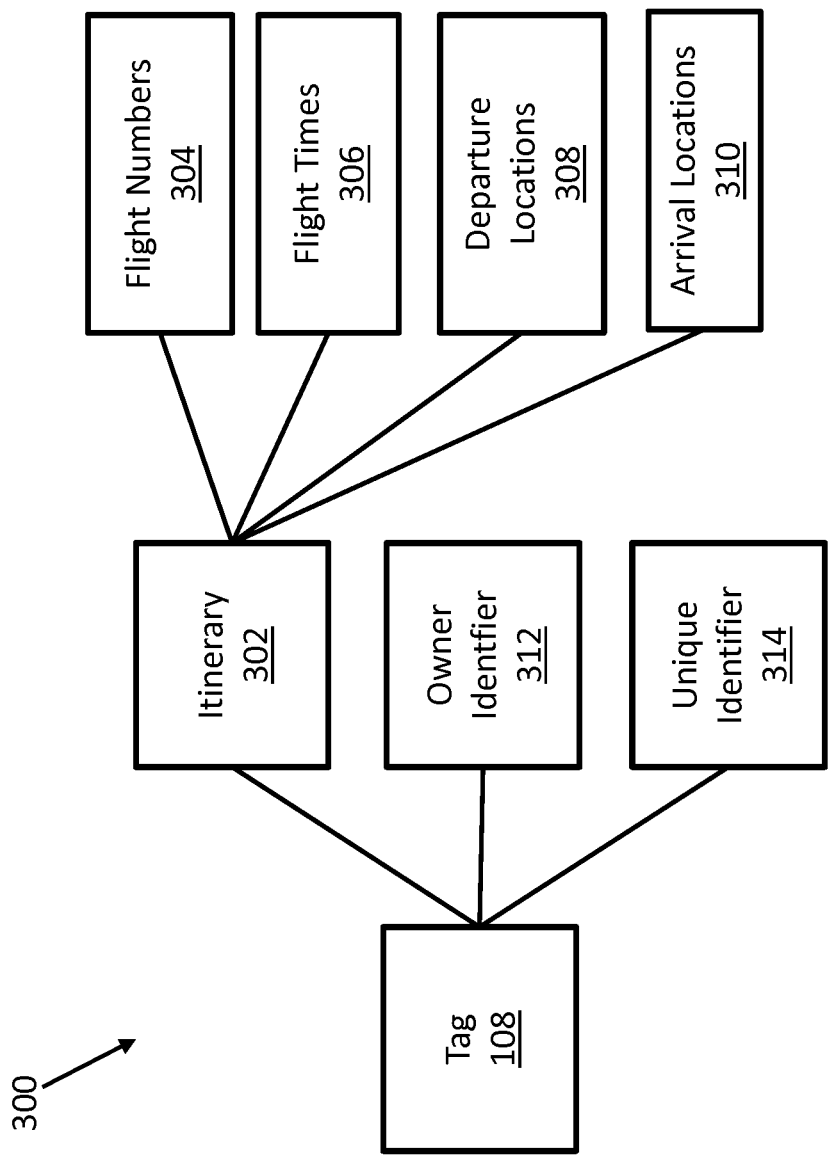
FIG. 3 is a diagram of information stored in association with a tag for the luggage item of FIG. 1.

FIG. 3 is a diagram of information 300 stored in association with tag 108 for luggage item 104. In some implementations, information 300 is stored in tag 108 when tag is created. In some implementations, information 300 is a first set of information that is programmed into tag 108 at a first time, for example before a first trip. In some implementations, tag 108 is reprogrammed at a second time, for example after the first trip and before a second trip, with a second set of information. Information 300 includes an itinerary 302 that includes information about a path (e.g., one or more flights) that luggage item 104 is scheduled to take in order to move from a first location to a second location. More specifically, in at least some implementations, itinerary 302 includes one or more flight numbers 304, one or more flight times 306, one or more departure locations 308, and one or more arrival locations 310.

Additionally, information 300 includes an owner identifier 312 that identifies an owner of luggage item 104 (e.g., first passenger 122). Additionally, information 300 includes a unique identifier 314 for tag 108. In some implementations, tag 108 stores all or a subset of information 300 and transmits all or a subset of information 300 in RFID signal 114. In some implementations, tag 108 stores only unique identifier 314 and the remainder of information 300, and any other information associated with tag 108 and/or luggage item 104, is stored in an external database (e.g., database 134) in association with unique identifier 314.

Figure 4:
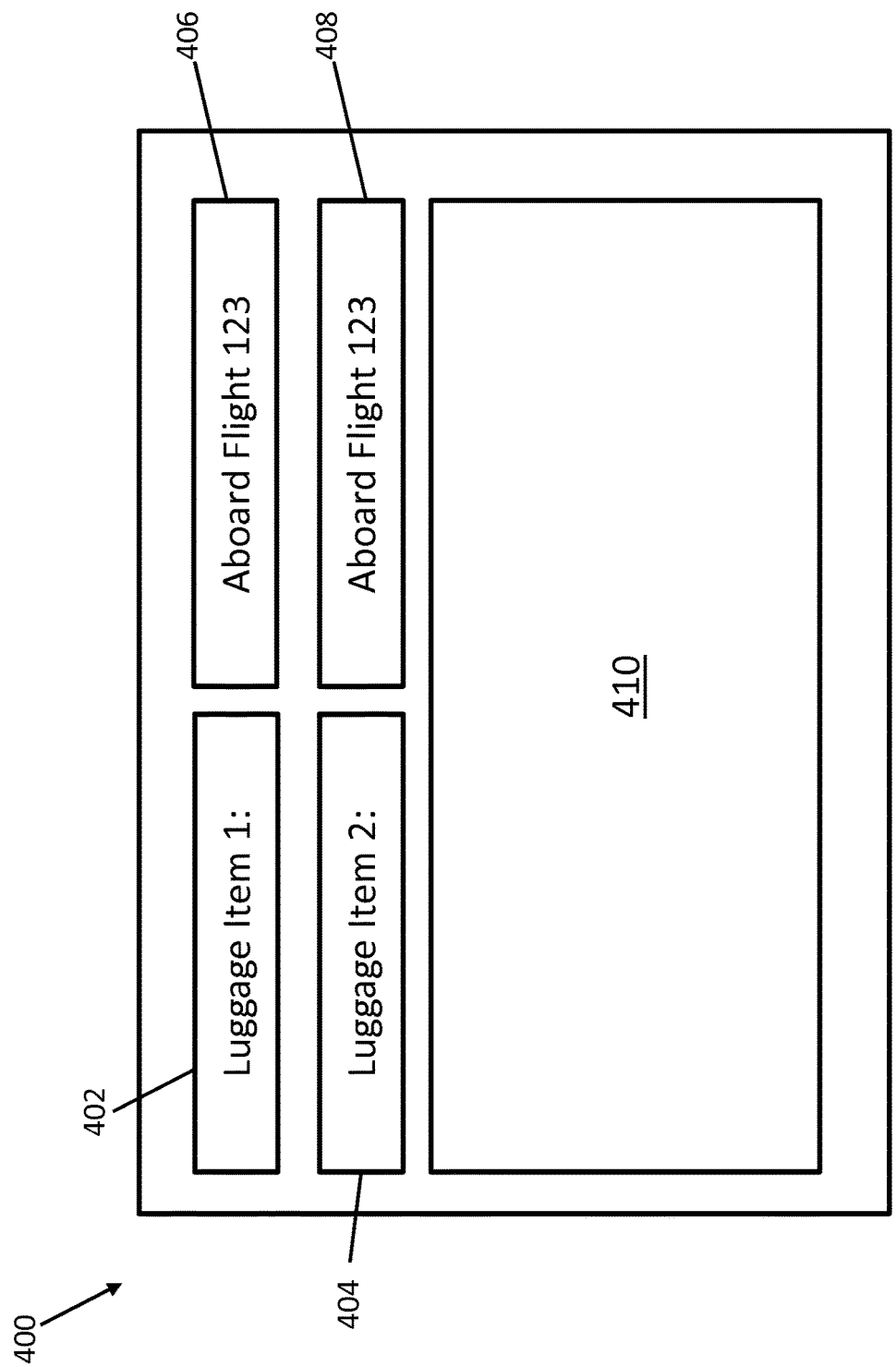
FIG. 4 is a diagram of an example user interface displaying information about the location of the luggage item of FIG. 1.

FIG. 4 is a diagram of an example user interface 400 displaying information about the location of luggage item 104. More specifically, user interface 400 includes a first luggage item field 402 that identifies a first luggage item (e.g., luggage item 104). Additionally, user interface 400 includes a second luggage item field 404 that identifies a second luggage item. Further, user interface 400 includes a first location field 406 that identifies the location of the first luggage item (e.g., luggage item 104) and a second location field 408 that identifies the location of the second luggage item.

Additionally, user interface 400 includes an additional information field 410 that includes other information pertaining to the first luggage item (e.g., luggage item 104), the second luggage item, itinerary 302, or other information. User interface 400 is generated by a client computing device, for example first client computing device 126, based on RFID signal 115 and/or luggage information signal 138, for viewing by the owner of the luggage (e.g., first passenger 122). User interface 400 provides verification that the luggage owned by first passenger 122 is accounted for and is aboard vehicle 102. In other implementations, user interface 400 indicates that luggage owned by first passenger 122 is aboard a different vehicle. For example, in some implementations, the luggage is transported to the same destination that the owner of the luggage is traveling to, but the luggage takes a different path (e.g., one or more different flights) to reach the destination.

Figure 5:
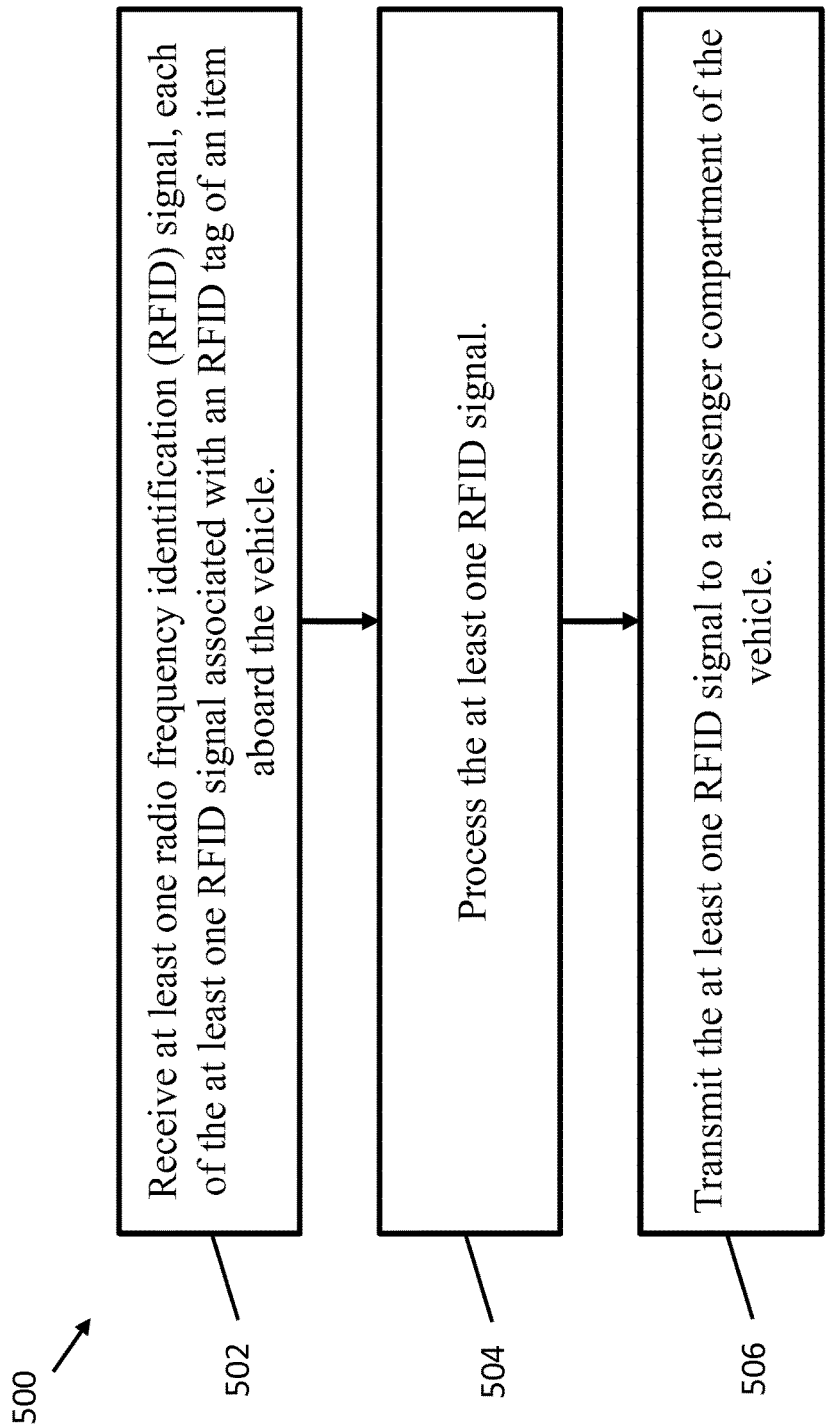
FIG. 5 is a flow chart of an example process for verifying the location of the luggage item of FIG. 1.

FIG. 5 is a flow chart of a process 500 that may be performed by transceiver device 118 for use in verifying a location of an item (e.g., luggage item 104) aboard a vehicle (e.g., vehicle 102). Initially, transceiver device 118 receives 502 at least one radio frequency identification (RFID) signal (e.g., RFID signal 114). Each of the at least one RFID signal (e.g., RFID signal 114) is associated with an RFID tag (e.g., tag 108) of an item (e.g., luggage item 104) aboard the vehicle (e.g., vehicle 102). Additionally, transceiver device 118 processes 504 the at least one RFID signal (e.g., RFID signal 114). Additionally, transceiver device 118 transmits 506 the at least one RFID signal (e.g., as RFID signals 115 and/or 117) to a passenger compartment (e.g., passenger compartment 120) of the vehicle (e.g., vehicle 102).

In some implementations, transceiver device 118 receives the at least one RFID signal (e.g., RFID signal 114) in a cargo compartment (e.g., cargo compartment 112) of the vehicle (e.g., vehicle 102). For example, in some implementations, transceiver device 118 is installed or otherwise located in the cargo compartment (e.g., cargo compartment 112). In some implementations, transceiver device 118 receives the at least one RFID signal (e.g., RFID signal 114) in a cargo compartment (e.g., cargo compartment 112) of an aircraft (e.g., vehicle 102). More specifically, in some implementations, vehicle 102 is an aircraft.

In some implementations, transceiver device 118 receives the at least one RFID signal (e.g., RFID signal 114) from at least one RFID tag (e.g., tag 108) located with (e.g., on or within) a luggage item (e.g., luggage item 104) onboard the vehicle (e.g., vehicle 102). In some implementations, transceiver device 118 generates at least one reformatted signal (e.g., reformatted signal 130) based on the at least one RFID signal (e.g., RFID signal 114) and transmits the at least one reformatted signal (e.g., reformatted signal 130) to a luggage tracking server computing device (e.g., luggage tracking server computing device 132) using at least one of a wireless network and a wired network (e.g., network 129).

In some implementations, in processing the at least one RFID signal (e.g., RFID signal 114), transceiver device 118 amplifies the at least one RFID signal (e.g., as RFID signals 115 and/or 117) such that it reaches the passenger compartment (e.g., passenger compartment 120). In some implementations, transceiver device 118 transmits the at least one RFID signal (e.g., as RFID signals 115 and/or 117) to at least one client computing device (e.g., first client computing device 126 and/or second client computing device 128) located in the passenger compartment (e.g., passenger compartment 120) of the vehicle (e.g., vehicle 102).

In some implementations, transceiver device 118 transmits the at least one RFID signal (e.g., as RFID signals 115 and/or 117) to at least one of a smart phone, a laptop, a notebook, and a watch (e.g., first client computing device 126 and/or second client computing device 128). In some implementations, transceiver device 118 transmits the at least one RFID signal (e.g., as RFID signals 115 and/or 117) to a passenger entertainment system (e.g., first client computing device 126 and/or second client computing device 128). In some implementations, at least one of first client computing device 126 and second client computing device 128 displays information regarding the luggage item (e.g., luggage item 104) associated with the at least one RFID signal (e.g., RFID signal 114).

A technical effect of systems and methods described herein includes at least one of: (a) receiving, by a transceiver device located in a vehicle, at least one radio frequency identification (RFID) signal, each of the at least one RFID signal associated with an RFID tag of an item aboard the vehicle; (b) processing the at least one RFID signal; and (c) transmitting, by the transceiver device, the at least one RFID signal to a passenger compartment of the vehicle.

As compared to known methods and systems for tracking information regarding the locations of one or more luggage items, in which a passenger in a vehicle may not be aware of whether the passenger's luggage has been loaded onto the vehicle for transport, the methods and systems described herein verify the location of the luggage to the passenger aboard the vehicle. Accordingly, passengers aboard vehicles equipped with systems described herein may be assured that their luggage has not been misplaced.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated. This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for use in verifying a location of a passenger's luggage item aboard a vehicle, the method comprising: receiving, by a transceiver device located in the vehicle, a first radio frequency identification (RFID) signal transmitted from a first RFID tag associated with a first luggage item aboard the vehicle, wherein the vehicle includes a passenger compartment and a cargo compartment, and wherein the first luggage item is located in the cargo compartment; processing the first RFID signal; retransmitting, by the transceiver device, the first RFID signal to a first passenger computing device located in the passenger compartment of the vehicle, wherein the first passenger computing device is associated with a first passenger, wherein the first passenger is associated with the first luggage item; receiving, by the first passenger computing device, the retransmitted first RFID signal; processing, by the first passenger computing device, the received first RFID signal; determining that the first RFID signal is associated with the first RFID tag; and displaying, on a display screen of the first passenger computing device, information regarding the first luggage item associated with the first RFID signal to the first passenger associated with the first luggage item.

2. The method of claim 1, wherein receiving the first RFID signal further comprises receiving the first RFID signal in the cargo compartment of the vehicle.

3. The method of claim 1, wherein receiving the first RFID signal further comprises receiving the first RFID signal in the cargo compartment of an aircraft.

4. The method of claim 1, further comprising: generating at least one reformatted signal based on the first RFID signal; and transmitting, by the transceiver device, the at least one reformatted signal to a luggage tracking server computing device using at least one of a wireless network and a wired network.

5. The method of claim 1, wherein processing the first RFID signal further comprises amplifying the first RFID signal.

6. The method of claim 1, wherein the at first passenger computing device is at least one of a smart phone, a laptop, and a watch.

7. A system for use in verifying a location of a passenger's luggage item aboard a vehicle, said system comprising a transceiver device configured to: receive a first radio frequency identification (RFID) signal transmitted from a first RFID tag associated with a first luggage item aboard the vehicle, wherein the vehicle includes a passenger compartment and a cargo compartment, and wherein the first luggage item is located in the cargo compartment; process the first RFID signal; retransmit the first RFID signal to a first passenger computing device located in the passenger compartment of the vehicle, wherein the first passenger computing device is associated with a first passenger, wherein the first passenger is associated with the first luggage item; receive, by the first passenger computing device, the retransmitted first RFID signal; process, by the first passenger computing device, the received first RFID signal; determine that the first RFID signal is associated with the first RFID tag; and display, on a display screen of the first passenger computing device, information regarding the first luggage item associated with the first RFID signal to the first passenger associated with the first luggage item.

8. The system of claim 7, wherein said transceiver device is further configured to receive the first RFID signal in the cargo compartment of an aircraft.

9. The system of claim 7, wherein said transceiver device is further configured to: generate at least one reformatted signal based on the first RFID signal; and transmit the at least one reformatted signal to a luggage tracking server computing device using at least one of a wireless network and a wired network.

10. The system of claim 7, wherein said transceiver device is further configured to process the first RFID signal by at least amplifying the first RFID signal.

11. The system of claim 7, wherein the at first passenger computing device is at least one of a smart phone, a laptop, and a watch.

12. A non-transitory computer-readable storage medium having computer-executable instructions embodied thereon for use in verifying a location of a passenger's luggage item aboard a vehicle, wherein when executed by a transceiver device, the computer-executable instructions cause the transceiver device to: receive a first radio frequency identification (RFID) signal transmitted from a first RFID tag associated with a first luggage item aboard the vehicle, wherein the vehicle includes a passenger compartment and a cargo compartment, and wherein the first luggage item is located in the cargo compartment; process the first RFID signal; retransmit the first RFID signal to a first passenger computing device located in the passenger compartment of the vehicle, wherein the first passenger computing device is associated with a first passenger, wherein the first passenger is associated with the first luggage item; receive, by the first passenger computing device, the retransmitted first RFID signal; process, by the first passenger computing device, the received first RFID signal; determine that the first RFID signal is associated with the first RFID tag; and display, on a display screen of the first passenger computing device, information regarding the first luggage item associated with the first RFID signal to the first passenger associated with the first luggage item.

13. The method of claim 1, further comprising: receiving, by the transceiver device, a plurality of RFID signals transmitting from a plurality of RFID tags each associated with a luggage item in the cargo compartment of the vehicle, and wherein each RFID signal of the plurality of RFID signals includes a unique identifier associated with the corresponding RFID tag; processing the plurality of RFID signals; and retransmitting, by the transceiver device, the plurality of RFID signals to the first passenger computing device located in a passenger compartment of the vehicle.

14. The method of claim 13, further comprising: storing, in the first passenger computing device, a first unique identifier associated with the first RFID tag; receiving, by the first passenger computing device, the plurality of RFID signals from the transceiver device; comparing, by the first passenger computing device, the plurality of unique identifiers associated with the plurality of RFID signals to the first unique identifier to detect the first unique identifier associated with the first RFID tag; and if the first unique identifier is detected, displaying, on the display screen of the first passenger computing device, information indicating that the first luggage item is located in the vehicle.

15. The method of claim 14, further comprising if the first unique identifier is not detected, displaying, on the display screen of the first passenger computing device, information indicating that the first luggage item is not currently located in the vehicle.

\* \* \* \* \*

UNITED STATES PATENT AND TRADEMARK OFFICE
CERTIFICATE OF CORRECTION

PATENT NO. : 9,817,113 B2
APPLICATION NO. : 14/520444
DATED : November 14, 2017
INVENTOR(S) : Loftis et al.

Page 1 of 1

It is certified that error appears in the above-identified patent and that said Letters Patent is hereby corrected as shown below:

In the Claims

In Column 7, Line 54, Claim 6, delete "at".

In Column 8, Line 23, Claim 11, delete "at".

Signed and Sealed this
First Day of May, 2018

Andrei Iancu
*Director of the United States Patent and Trademark Office*